United States Patent [19]

Kesler

[11] Patent Number: 4,773,043

[45] Date of Patent: Sep. 20, 1988

[54] ADCCP COMMUNICATION PROCESSOR

[75] Inventor: Lynn O. Kesler, Fountain Valley, Calif.

[73] Assignee: The United States of America as represented by the Secretary of the Air Force, Washington, D.C.

[21] Appl. No.: 698,725

[22] Filed: Feb. 6, 1985

[51] Int. Cl.$^4$ ............................................. G06F 13/00
[52] U.S. Cl. ..................................................... 364/900
[58] Field of Search ... 364/200 MS File, 900 MS File

[56] References Cited

U.S. PATENT DOCUMENTS

| | | | |
|---|---|---|---|
| 4,126,764 | 11/1978 | Downey et al. | 370/102 |
| 4,225,919 | 9/1980 | Kyu et al. | 364/200 |
| 4,244,018 | 1/1981 | Mui | 364/200 |
| 4,281,318 | 7/1981 | Candy et al. | 340/347 DD |
| 4,336,588 | 6/1982 | Vernon et al. | 364/200 |
| 4,455,622 | 6/1984 | Loskorn et al. | 364/900 |
| 4,546,429 | 10/1985 | Chan et al. | 364/200 |

Primary Examiner—Eddie P. Chan
Attorney, Agent, or Firm—William Stepanishen; Donald J. Singer

[57] ABSTRACT

An ADCCP communication processor apparatus operates on-line between the PARCS data transmission controller (DTC) and the NORAD Cheyenne Mountain complex. The ADCCP communication processor apparatus accepts AUTODIN Mode 1, 80 character block by block serial transmission from PARCS DTC (channels 2 and 3), reformats the messages into an ADCCP frame structure, and multiplexes and interleaves the transmission to the NCMC computer on a prime data link.

3 Claims, 1 Drawing Sheet

CMEWS-CSS ADCCP PROTOCOL INTERFACES

ADCCP COMMUNICATION PROCESSOR

STATEMENT OF GOVERNMENT INTEREST

The invention described herein may be manufactured and used by or for the Government for governmental purposes without the payment of any royalty thereon.

BACKGROUND OF THE INVENTION

The present invention relates broadly to a communication processor, and in particular an Advanced Data Communication Control Procedure (ADCCP) communication processor system.

In the prior art, communication processors may be found in a variety of forms which perform any of a number of communication tasks. One such type of advanced communications data link controller apparatus is found in U.S. Pat. No. 4,225,919 issued to Shikun Kyu and Edward G. Hepworth which is capable of accommodating three bit-oriented protocols including Advanced Data Communications Control Procedure. The controller provides an interface between a microcomputer or terminal and a data communications link as well as a data communications interface for primary and secondary stations in stand-alone, polling, and loop configurations. Multipoint configurations take the form of a single primary station connected to a plurality of secondary stations in a parallel arrangement.

Another communication processor technique is disclosed in U.S. Pat. No. 4,244,018 issued to Wing F. Mui wherein there is disclosed an apparatus for controlling asynchronous data transfer between a host processor and a plurality of microprocessors using a common buffer. A digital-to-digital code convertor for receiving a series of input samples at a first rate and for generating a corresponding series of output samples at a second rate is disclosed in U.S. Pat. No. 4,281,318 issued to James C. Candy and Bruce A. Wooley.

The ADCCP communications processor interfaces with the PARCS radar computer and the North American Air Defense (NORAD) computer and translates messages between the two. The ADCCP communications processor. (ACP) has two autodin Mode I-type ports (PARCS) and eight (8) ADCCP-type ports (NORAD NCMC).

SUMMARY OF THE INVENTION

The present invention is an electronic communications processor utilizing an 8085 microprocessor, associated program, and data storage memory, ADCCP protocol handler circuits for each of 8 ADCCP I/0 port, Universal Synchronous/Asynchronous Receiver/Transmitter (USART) circuits for the 2 PARCS I/0 ports, and direct memory access control electronics to permit message transfers from each I/0 port to memory, independent of microprocessor activity.

It is one object of the present invention, therefore, to provide an improved ADCCP communications processor.

It is another object of the invention to provide an improved ADCCP communications processor which accepts Autodin Mode 1 serial transmissions and reformats the messages into an ADCCP frame structure.

It is another object of the invention to provide an improved ADCCP communications processor which utilizes a prime data link in parallel with a backup data link to relieve message overloads.

These and other advantages, objects and features of the invention will become more apparent after considering the following description taken in conjunction with the illustrative embodiment in the accompanying drawings.

DESCRIPTION OF THE PREFERRED EMBODIMENT

Figure 1:
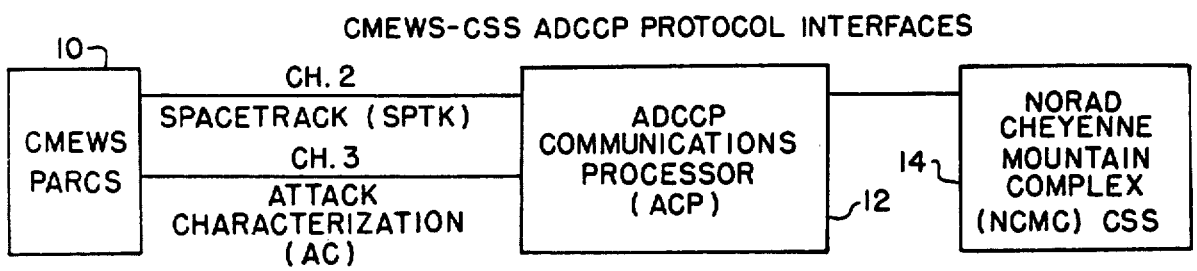
FIG. 1 is a block diagram of the ADCCP communications processor data links according to the present invention, and, FIG. 2 is a detailed block diagram of the ADCCP communications processor apparatus.

Referring now to FIG. 1, there is shown a block diagram of the ADCCP communications processor apparatus 12 connected to the PARCS communications unit 10 and the Norad Cheyenne Mountain Complex (NCMC) communications unit 14. The ACP unit 12 receives Autodin Mode 1, 80-character block-by-block serial transmission from the PARCS unit 10 data transmission controller channels 2 and 3 and reformat the messages into the ADCCP frame structure, multiplexed and interleaved for transmission to the NCMC unit 14 as shown. If messages are received from the PARCS unit 10 faster than the ACP unit 12 can transmit to the NCMC unit 14 on the prime link, then ACP unit 12 transmits to the NCMC unit 14 on the prime and backup links using trunking techniques.

The ADCCP communications processor (ACP) unit 12 is a communications processor which is designed to support the EPARCS effort for the Perimeter Acquisition Radar Attack Characteristics System unit 10. The ACP unit 12 operates on-line between the PARCS unit 10 data transmission controller (DTC) and the NORAD Cheyenne Mountain complex unit 14. The ACP unit 12 accepts AUTODIN Mode 1, 80 character block by block serial transmission from the PARCS unit 10 DTC (channels 2 and 3), reformats the messages into an ADCCP frame structure, and multiplexes and interleaves the transmission to the NCMC unit 14 computer on a prime data link. Depending upon message traffic rate the ACP transmits to the NCMC using trunking techniques.

Figure 2:
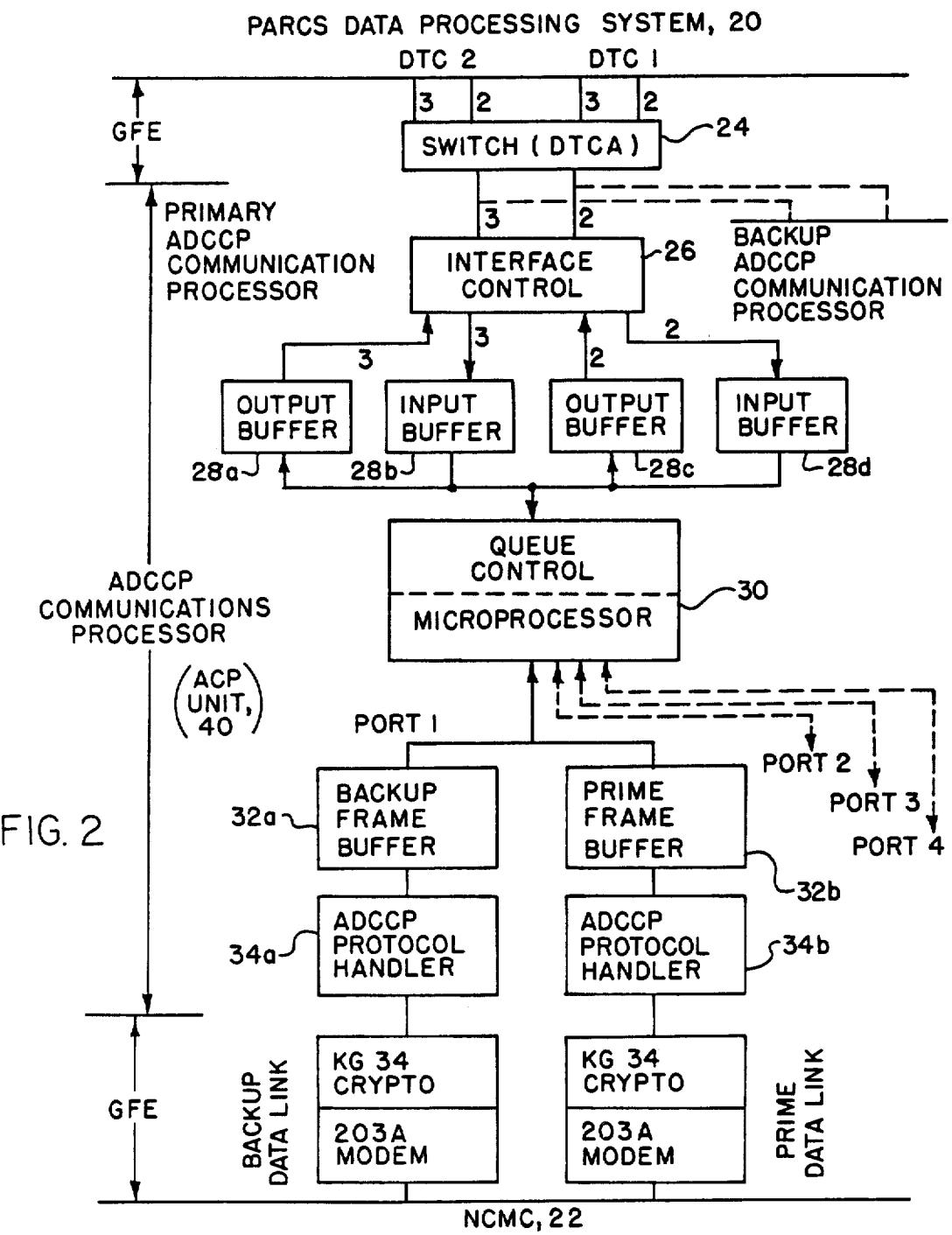

Turning now to FIG. 2, there is shown a block diagram of the ADCCP communications processor (ACP unit 40) which is connected between the PARCS data processing system, 20 and the NCMC data processing system, 22. The ACP unit is comprised of an interface control unit 26, AUTODIN buffer units 28a–28d, microprocessor and Queue control unit 30, ADCCP buffer units 32a, 32b, and ADCCP protocol handling units 34a, 34b. The PARCS data processing system, 20 includes data transmission controller units, DTC1 and DTC2, which operate on channels 2 and 3 respectively, and provides data to the ADCCP communications processor apparatus by means of switch unit 24. The interface control unit 26 interfaces the ACP unit 40 with the PARCS data processing system, 20 by means of a 9600 baud full duplex asynchronous serial data link. The data transmission contains 1 start bit, 8 data bits (7 data +parity) and 1 stop bit. This interface conforms to MIL 188C-Low Level.

The interface control unit 26 is a standard commerically unit such as the Intel USAT unit. The ADCCP buffer units, 32a–32b provides the ACP unit 40 with the buffer capacity to store a 50 block AUTODIN message from the PARCS system 20, to the NCMC, system 22. It also contains buffers to store sixteen ADCCP message frames (8 input and 8 output), with each message frame having a maximum length of 246 bytes. This storage allows the ACP unit 40 to transmit/receive up to seven message frames prior to an acknowledgement in accordance with ADCCP procedures. Storage of an eighth frame is provided to handle control frames.

The ACP protocol handler performs serial to parallel, parallel to serial conversion, zero bit insertion/deletion, and cyclic redundancy check (CRC) generation and checking. This is accomplished by the use of the Intel 8273 integrated circuit unit. The ACP interfaces with NCMC via a 4800 baud full duplex, synchronous, ADCCP format serial data links. This interface also conforms with MIL 188C low level.

The ACP systems comprises an independent primary processor link (ACP unit 40) and a redundant processor link (back up ADCCP Communication Processor, unit 40a). Only the primary ACP unit 40 is on-line at a time while the back up ACP unit 40a is acting as a standby or spare link. The standby ACP unit 40a may be placed on line simply by moving two twist lock cables from the prime processor ACP unit 40 to the standby processor unit 40a. Each ACP unit 40, 40a contains a ADCCP microprocessor card and four memory I/0 cards. The memory I/0 cards are identical and may be used in any slot. Addressing of the memory and I/0 devices is controlled by slot location therefore the operator may be required to change EPROMS when moving memory I/0 cards to a different slot location.

The ADCCP microprocessor unit 30 utilizes a single board micro computer (microprocessor 30) on a multilayer printed circuit card. The ADCCP microprocessor unit 30 is based on the commercially available Intel Corporation 8085 central processor unit which is operated at a clock frequency of 6.144 MHz. Standard baud rates are achieved by using a programmable interval timer which is commercially available from the Intel Corporation to count the clock frequency of 6.144 MHz down to the desired baud rate. The programmable interval timer provides both baud rates and a timer which are necessary to provide the time out functions that required by the ACP system requirements.

The ADCCP communication processor unit 40 includes a programmable interrupt controller which provides 15 levels of cascaded interrupts in addition to the four provided by the microprocessor 30. These interrupts are used by the ACP unit 40 to provide I/0 device requests for both the AUTODIN channels 2 and 3 USART serial devices (Intel Corporation 8251) and the ADCCP dual port channels protocol handler units 34a, 34b. The programmable interrupt controller unit is commercially available from Intel Corporation under the designation of an 8259 interrupt controller. The ADCCP protocol handler units 34a, 34b are also commercially available from Intel Corporation under the designation of an 8273 SDLC/HDLC (synchronous or high-level data link control) protocol controller.

The ADCCP communication processor unit 40 includes a multimode DMA controller Am 9517, which controls priority of direct memory access (DMA) requests from the memory I/0 boards. This device acts as a master controller and cascades the four direct memory access (DMA) controllers which are located on the memory I/0 boards together. The ADCCP communication processor unit utilizes a field programmable logic array unit which controls the ACP system control, address and data buses. By modifying the firmware in this device allows rapid modification to the controls of these buses.

A latch unit LS373 latches the lower order address from the multiplexed data/address lines on the microprocessor device to the system address bus. A number of buffer units are utilized to provide input and output buffering for both the upper order addresses and the system control buses. These buffers are controlled by the master direct memory access (DMA) hold acknowledge. If a direct memory access (DMA) is in progress the system control bus (MEMWN, MEMRN, IOWN and IORN) and the address output buffers are disabled, thus allowing the direct memory access (DMA) device to have access to these buses. The buffer units which are located in card slots A20 and A17 are the data input and output data buffers. These buffers are controlled by the field programmable logic array unit which is located in card slot A15.

The memory I/0 board is a 6.5×10 inch multiwire card. Each memory I/0 board has 2K EPROM for ACP firmware, 14K RAM to provide ACP buffers, 1 universal asynchronous serial data device, 2 protocol handlers 8273 and miscellaneous logic required for conditioning and address decoding.

A universal asynchronous communication interface unit is located in card slot A33 of the microprocessor unit 30. This universal asynchronous communication interface unit when located on the memory I/0 board located in card slot number 1, is used to communicate with the PARCS data transmission controller (DTC) channel 2. When located in card slot number 2 of the memory I/0 board, it communicates with the PARCS data transmission controller (DTC) channel 3.

The programmable HDLC/SDLC protocol controller units which are located in card slots A24 and A25, are used to interface with the ADCCP protocol for the NCMC. These protocol controller units are interrupt driven and controlled the direct memory access (DMA) controller unit which is located in card slot A26. The AUTODIN status latch unit is located in card slot A31. The buffer unit which buffers the system control bus and allows the microprocessor to read the status of the display panel, is located in card slot A29. The data conversion which is required for the MIL-188C interfaces for both PARCS and NCMC are provided by quad driver units (located in card slots A1–A4) and the dual receiver units which are located in card slots A5–A8 and A13–A15 respectively.

Although the invention has been described with reference to a particular embodiment, it will be understood to those skilled in the art that the invention is capable of a variety of alternative embodiments within the spirit and scope of the appended claims.

What is claimed is:

1. An ADCCP communication processor apparatus to interface between the PARCS communication system and the NCMC communication system for purposes of reformatting and translating messages therebetween comprising in combination:
 a serial asynchronous port connected to the PARCS DTCA serial port switch and a means of selecting a desired link, said serial asynchronous port providing a means for transmitting and receiving data from the PARCS communication system,
 an interface control unit connected to said serial asynchronous port for controlling the data flow to and from said serial port switch, two input and two output Autodin data buffers to provide means for storing Autodin messages from and to the PARCS data processing unit in said PARCS communication system, Queue control and a microprocessor means operatively connected to said interface control means to process data signals therebetween, said microprocessor means receiving serial data from said PARCS communication system and reformatting the messages from an Autodin Mode 1, 80 character block format into ADCCP frame structrue using an HDLC format using message having a maximum length of 246 bytes for transmission to the NCMC communication system, said Autodin Mode 1 Format comprises a standard 80 character card image block by block protocol, and, a protocol controller means operatively connected between said microprocessor means and said NCMC communication system, said protocol controller means buffering the data flow therebetween, said protocol controller means providing serial to parallel, parallel to serial data conversion, zerio bit insertion/deletion, and cyclic redundancy check generation and checking of the data signals therein, said protocol controller means comprises in combination:

a prime and backup frame buffer means to buffer the data signal flow between said NCMC combination system and said microprocessor means, and a protocol handler means to establish data transmission formats.

2. An ADCCP communication processor apparatus as described in claim 1 wherein said interface control unit interfaces with the PARCS communication system via a 9600 baud full duplex asynchronous serial data link.

3. An ADCCP communication processor apparatus as described in claim 1 wherein said protocol controller means interfaces with the NCMC communication system via a 4800 band full duplex, synchronous, ADCCP to format serial data link.

* * * * *